United States Patent
Zhang

(10) Patent No.: US 12,530,734 B2
(45) Date of Patent: Jan. 20, 2026

(54) IMAGE PROCESSING METHOD AND APPARATUS, ELECTRONIC DEVICE, AND STORAGE MEDIUM FOR HOMOGRAPHY TRANSFORMATION

(71) Applicant: Black Sesame Technologies Co., Ltd., Wuhan (CN)

(72) Inventor: Deyong Zhang, Wuhan (CN)

(73) Assignee: Black Sesame Technologies Co., Ltd. (CN)

(*) Notice: Subject to any disclaimer, the term of this patent is extended or adjusted under 35 U.S.C. 154(b) by 285 days.

(21) Appl. No.: 18/230,563

(22) Filed: Aug. 4, 2023

(65) Prior Publication Data

US 2024/0046408 A1 Feb. 8, 2024

(30) Foreign Application Priority Data

Aug. 4, 2022 (CN) .......................... 202210934372.6

(51) Int. Cl.
*G06T 3/18* (2024.01)
*G06T 7/30* (2017.01)

(52) U.S. Cl.
CPC . *G06T 3/18* (2024.01); *G06T 7/30* (2017.01)

(58) Field of Classification Search
CPC .... G06T 3/18; G06T 7/30; G06T 3/00; G06T 3/4007
See application file for complete search history.

(56) References Cited

U.S. PATENT DOCUMENTS

| | | | | |
|---|---|---|---|---|
| 7,929,043 | B2* | 4/2011 | Tsubaki | H04N 23/68 348/348 |
| 9,984,436 | B1* | 5/2018 | Chen | G06T 1/60 |
| 2005/0180655 | A1* | 8/2005 | Ohta | G06T 3/4007 382/300 |
| 2007/0279434 | A1* | 12/2007 | Fujita | G06T 15/04 345/611 |
| 2016/0269693 | A1* | 9/2016 | Moriguchi | H04N 25/134 |
| 2016/0292831 | A1* | 10/2016 | Bogan | G06T 3/00 |
| 2016/0292832 | A1* | 10/2016 | Bogan | G06T 5/50 |
| 2019/0096031 | A1* | 3/2019 | Yang | G06T 3/4007 |
| 2019/0279427 | A1* | 9/2019 | Tang | G06T 3/4007 |
| 2021/0302724 | A1* | 9/2021 | Imatoh | G06T 3/18 |
| 2022/0215506 | A1* | 7/2022 | Wu | H04N 23/88 |

* cited by examiner

*Primary Examiner* — Michael Le
(74) *Attorney, Agent, or Firm* — Timothy T. Wang

(57) ABSTRACT

Disclosed are an image processing method and apparatus, an electronic device, and a storage medium. The image processing method determines mapping coordinates of a pixel point in a pixel block with one pixel block as a unit, and in this process, only a first pixel in the pixel block transformed through homography transformation based on a homography transformation formula to obtain projection coordinates thereof, and mapping coordinates of other pixel points (that is, second pixels) in the pixel block may be determined through a positional relationship between one of the plurality of second pixels and the first pixel in the pixel block. In this way, times of the homography transformation may be reduced, which is beneficial to reducing quantity of computation required by an entire image processing method and improving computation efficiency of the image processing method.

11 Claims, 9 Drawing Sheets

IMAGE PROCESSING METHOD AND APPARATUS, ELECTRONIC DEVICE, AND STORAGE MEDIUM FOR HOMOGRAPHY TRANSFORMATION

CROSS-REFERENCE TO RELATED APPLICATIONS

The disclosure claims priority to Chinese Patent Application CN2022109343726, filed on Aug. 4, 2022, the entire contents of which are incorporated herein by reference.

FIELD OF THE INVENTION

The present specification relates to homography transformation technologies in the field of image processing, and more particularly, to an image processing method and apparatus, an electronic device, and a storage medium.

BACKGROUND OF THE INVENTION

Homography is a concept in projective geometry, also known as projective transformation. Homography is widely used in image registration for image correction. Homography plays a very important role in many fields such as image registration, image stitching, camera pose estimation, visual simultaneous localization, and mapping (SLAM).

Homography transformation refers to mapping a point (a three-dimensional homogeneous vector) on a projective plane to another projective plane. It is a projective relationship since it depends on the intersection of planes with lines. The homography transformation is a linear transformation with respect to the three-dimensional homogeneous vector, and may be represented by a 3×3 non-singular matrix H. The matrix H is called a homography matrix, and a point on a projective plane may be projected to another plane by using the matrix.

At present, in a process of image correction based on the homography transformation, there is a problem of large quantity of computation and long running times. It is necessary to reduce the quantity of computations in an image processing process such as image correction, to improve calculation efficiency.

SUMMARY OF THE INVENTION

The present disclosure provides an image processing method and apparatus, an electronic device, and a storage medium, to achieve a purpose of reducing the quantity of computations of an image processing method and improving calculation efficiency.

In order to achieve the technical purpose mentioned above, embodiments of the present disclosure provide the following technical solutions.

According to a first aspect, embodiments of the present specification provide an image processing method, including:

acquiring a first image, where the first image includes a plurality of pixel blocks, and each of the plurality of pixel blocks includes a first pixel and a plurality of second pixels;

acquiring, based on a homography transformation formula, mapping coordinates of the first pixel, where the mapping coordinates of the first pixel are projection coordinates of the first pixel to a second image;

acquiring, based on the mapping coordinates of the first pixel and a relative positional relationship, mapping coordinates of the second pixel, where the relative positional relationship is a positional relationship between the second pixel and the first pixel in the pixel block, and the mapping coordinates of the second pixel are projection coordinates of the second pixel to the second image; and performing, based on mapping coordinates of pixel points in the first image, interpolation on the second image, to obtain a corrected target image.

Optionally, the acquiring, based on the mapping coordinates of the first pixel and a relative positional relationship, mapping coordinates of the second pixel includes:

superimposing the mapping coordinates of the first pixel with a relative distance to obtain the mapping coordinates of the second pixel, where the relative distance is a distance between the second pixel and the first pixel in the pixel block.

Optionally, the distance between the second pixel and the first pixel includes a relative distance in each coordinate axis direction in a coordinate system where the first pixel and the second pixel are located.

Optionally, the pixel block comprises m rows×n columns of pixels, a value of m is 4 or 8 or 16, and a value of n is 4 or 8 or 16; and the performing, based on mapping coordinates of pixel points in the first image, interpolation on the second image, to obtain a corrected target image includes:

performing, based on the mapping coordinates of the pixel points in the first image, and based on a single instruction multiple data technology, the interpolation on the second image, to obtain the corrected target image, where the mapping coordinates of the pixel points include the mapping coordinates of the first pixel and the mapping coordinates of the second pixel.

Optionally, the performing, based on the mapping coordinates of the pixel points in the first image, and based on a single instruction multiple data technology, the interpolation on the second image, to obtain the corrected target image includes:

performing, based on the single instruction multiple data technology, taking a row of pixel points in the pixel block as a unit, linear interpolation on the second image in a first direction, to obtain interpolation points of the row of pixel points in the pixel block in the first direction; and performing, based on the single instruction multiple data technology, taking the interpolation points of the row of pixel points in the pixel block in the first direction as a unit, linear interpolation on the second image in a second direction, to obtain the corrected target image, where the first direction intersects with the second direction.

Optionally, the performing, based on the single instruction multiple data technology, taking a row of pixel points in the pixel block as a unit, linear interpolation on the second image in a first direction includes:

acquiring first adjacent coordinates, where the first adjacent coordinates include coordinates of an upper left pixel point, an upper right pixel point, a lower left pixel point and a lower right pixel point of preset mapping coordinates, and the preset mapping coordinates are mapping coordinates of a first pixel point of the row of pixel points in the pixel block;

loading N consecutive pixel values taking the first adjacent coordinates as a starting point into a first vector register corresponding to the first adjacent coordinates, where N is equal to a quantity of pixel points in the row of pixel points in the pixel block;

loading a first offset value and a second offset value into a second vector register and a third vector register respectively, where the first offset value is an offset, in the first direction, of a point to be interpolated relative to an upper left pixel point adjacent to the point to be interpolated, and the second offset value is an offset, in the second direction, of the point to be interpolated relative to the upper left pixel point adjacent to the point to be interpolated, and points to be interpolated are in one-to-one correspondence with pixel points in the first image; and calculating, by using values loaded in the first vector register and the second vector register, based on a linear interpolation principle, interpolation points of the row of pixel points in the pixel block in the first direction.

Optionally, the performing, based on the single instruction multiple data technology, taking the interpolation points of the row of pixel points in the pixel block in the first direction as a unit, linear interpolation on the second image in a second direction includes:

calculating, by using values loaded in the third vector register and the interpolation points of the row of pixel points in the first image in the first direction, according to the linear interpolation principle, interpolation points of the row of pixel points in the pixel block in the second direction.

Optionally, the acquiring a first image includes:

acquiring a first image comprising a plurality of pixel blocks of a same size, where a first pixel in each of the plurality of pixel blocks is located at a same position in the pixel block.

Optionally, a size of each of the plurality of pixel blocks is not exactly the same with each other.

According to a second aspect, the embodiments of the present specification further provide an image processing apparatus, including:

an image acquisition module, configured to acquire a first image, where the first image comprises a plurality of pixel blocks, and each of the plurality of pixel blocks includes a first pixel and a plurality of second pixels;

a homography transformation module, configured to acquire, based on a homography transformation formula, mapping coordinates of the first pixel, where the mapping coordinates of the first pixel is projection coordinates of the first pixel to a second image;

a coordinate calculation module, configured to acquire, based on the mapping coordinates of the first pixel and a relative positional relationship, mapping coordinates of the second pixel, where the relative positional relationship is a positional relationship between the second pixel and the first pixel in the pixel block, and the mapping coordinates of the second pixel are projection coordinates of the second pixel to the second image; and an image correction module, configured to perform, based on mapping coordinates of pixel points in the first image, interpolation on the second image, to obtain a corrected target image.

According to a third aspect, the embodiments of the present specification further provide an electronic device, including: a memory and a processor, wherein the memory is connected to the processor, and configured to store a program; and the processor is configured to implement any one of the image processing methods described above by running the program stored in the memory.

According to a fourth aspect, the embodiments of the present specification provide a non-transitory storage medium, where a computer program is stored on the non-transitory storage medium, and when the computer program is run by a processor, any one of the image processing methods described above is implemented.

According to a fifth aspect, the embodiments of the present specification provide a computer program product or a computer program, where the computer program product or the computer program includes computer instructions stored in a computer-readable storage medium, a processor of a computer device reads the computer instructions from the computer-readable storage medium, and the processor implements steps of the image processing method described above when the processor executes the computer instructions.

As may be seen from the technical solutions described above, embodiments of the present disclosure provide an image processing method and apparatus, an electronic device, and a storage medium. According to the image processing method, mapping coordinates of a pixel point in a pixel block with one pixel block as a unit is determined. In this process, only a homography transformation formula is used to perform homography transformation on a first pixel in the pixel block to obtain mapping coordinates of the first pixel, and mapping coordinates of other pixel points (that is, second pixels) in the pixel block may be determined through positional relationships between the second pixels and the first pixel in the pixel block. In this way, when the mapping coordinates of the pixel points in the pixel block are determined, times of homography transformation which is relatively complex in an operation process is greatly reduced (if a pixel block includes M pixel points, times of homography transformation may be reduced to 1/M times), which is beneficial to reducing quantity of computation required by an entire image processing method, and improving computation efficiency of the image processing method.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various other aspects of the disclosure. Any person having ordinary skill in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles. Furthermore, the drawings may contain text or captions that may explain certain embodiments of the present invention. This text is included for illustrative, non-limiting, explanatory purposes of certain embodiments detailed in the present invention. In the drawings.

Embodiments of the invention are described with reference to the following figures. The same numbers are used throughout the figures to reference similar features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION OF THE INVENTION

Figure 1:
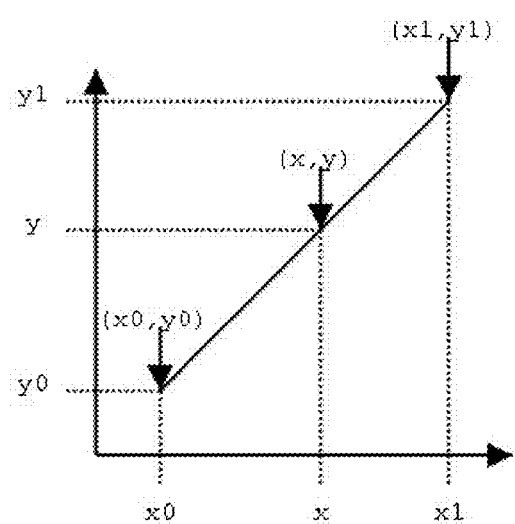
FIG. 1 is a schematic diagram of linear interpolation according to an embodiment of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications, and equivalents consistent with the principles and features disclosed. For clarity, details relating to technical material that is known in the technical fields related to the invention have not been described in detail so as not to unnecessarily obscure the present invention.

In the description and claims of the application, each of the words "units" represents the dimension in any units such as centimeters, meters, inches, foots, millimeters, micrometer and the like and forms thereof, are not necessarily limited to members in a list with which the words may be associated.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

Regarding applicability of 35 U.S.C. § 112, ¶16, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items from the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present invention contains headers. It should be understood that these headers are used as references and are not to be construed as limiting upon the subjected matter disclosed under the header.

This specification comprises references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems and methods are now described.

Unless otherwise defined, technical terms or scientific terms used in embodiments of the present specification should be usual meanings which may be understood by one of ordinary skill in the field to which the present specification belongs. Terms "first", "second" and similar terms used in the embodiments of the present specification do not indicate any order, quantity, or importance, but are merely used to avoid confusion of constituent elements.

Unless it is requested in context, in the entire specification, "a plurality of" means "at least two", and "including" is interpreted as open and inclusive, that is, "including, but not limited to". In description of the specification, terms "an embodiment", "some embodiments", "exemplary embodiments", "examples", "specific examples" or "some examples", and the like, are intended to indicate that a particular feature, a structure, a material, or a characteristic related to an embodiment or an example is included in at least one embodiment or example of the present specification. Schematic representation of above terms does not necessarily refer to a same embodiment or example.

Technical solutions in the embodiments of the present specification will be clearly and completely described below with reference to accompanying drawings in the embodiments of the present specification. Obviously, described embodiments are only a part of embodiments of the present specification, rather than whole embodiments. All other embodiments obtained by a person of ordinary skill in the art based on the embodiments of the present specification without creative efforts shall fall within scope of protection of the present specification.

An image processing method provided in the embodiments of the present specification may be applied to an image correction process in application scenarios such as image alignment, image stitching, camera pose estimation, visual SLAM, and the like. By dividing an image into blocks to calculate mapping coordinates and using single instruction multiple data technology to perform image correction, quantity of computation required by the image processing method is reduced, thereby improving computing efficiency and execution efficiency of the image processing method.

Above all, several terms involved in the present specification will be explained in the following.

Homography transformation, as described above, is a concept in projective geometry, and is also referred to as projective transformation. The homography transformation refers to mapping a point (a three-dimensional homogeneous vector) on a projective plane to another projective plane. The homography transformation is a linear transformation with respect to the three-dimensional homogeneous vector, and may be represented by a 3×3 non-singular matrix H. The matrix H is called a homography matrix, and a point on a projective plane may be projected to another plane by using the matrix. Two points of a projection relationship on two planes become corresponding points, and the homography matrix is a transformation matrix from one image to another image. According to a traditional homography transformation method, based on a homography transformation formula as shown in formula (1), mapping coordinates of each pixel point in a reference image relative to an image to be corrected are calculated. After the mapping coordinates are obtained, the image to be corrected will be interpolated to obtain interpolation pixel values, and an image correction process is completed.

$$\begin{bmatrix} x_2 \\ y_2 \\ 1 \end{bmatrix} = H \begin{bmatrix} x_1 \\ y_1 \\ 1 \end{bmatrix}, \tag{1}$$

where $$H = \begin{bmatrix} h_{11} & h_{12} & h_{13} \\ h_{21} & h_{22} & h_{23} \\ h_{31} & h_{32} & h_{33} \end{bmatrix}$$

In formula (1), $(x_1, y_1, 1)$ and $(x_2, y_2, 1)$ respectively represent homogeneous coordinates of the corresponding points on two images, and $h_{ij}$, i=1, 2, 3; j=1, 2, 3 represent parameters of the homography matrix.

Linear interpolation refers to a method of using a straight line connecting two known quantities to determine a value of an unknown quantity between the two known quantities. Referring to FIG. 1, assuming that coordinates $(x_0, y_0)$ and $(x_1, y_1)$ are known to us, a two-point linear equation is obtained to calculate a value of a certain position x in an interval on the straight line:

$$\frac{y - y_0}{y_1 - y_0} = \frac{x - x_0}{x_1 - x_0} \tag{2}$$

Assuming that values on both sides of the equation are α, then this value is an interpolation coefficient (that is, a ratio of a distance from x0 to x to a distance from x0 to x1). Since the value of x is known, the value of a may be obtained through a formula:

$$\alpha = \frac{x - x_0}{x_1 - x_0} \tag{3}$$

In this way, equation (2) above may be expressed as:

$$y = (1-\alpha)y_0 + \alpha y_1 \tag{4}$$

In this way, a value of y is obtained through the value of α. A process of finding x through y is similar to the above process, and details are not described herein.

Bilinear interpolation is also referred to as bilinear inner interpolation. Mathematically, the bilinear interpolation is a linear interpolation expansion of an interpolation function of two variables, and a core idea of the bilinear interpolation is to perform linear interpolation in two directions (such as X-axis and Y-axis directions), respectively.

Figure 2:
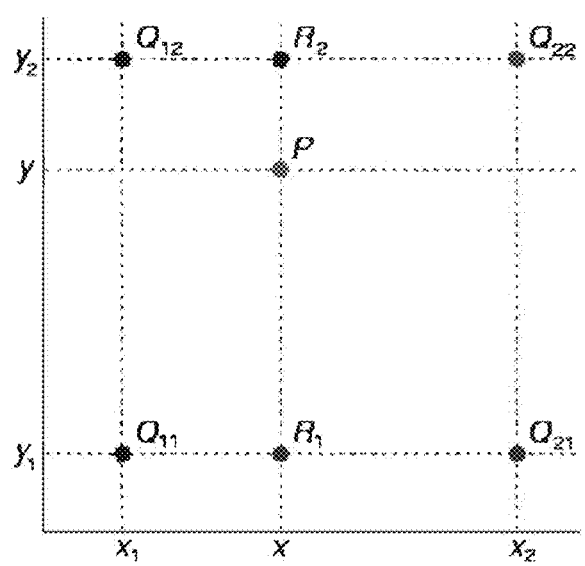
FIG. 2 is a schematic diagram of bilinear interpolation according to an embodiment of the present specification.

Referring to FIG. 2, Q11, Q12, Q21 and Q22 in FIG. 2 are respectively four known pixel points, and point P is a point to be interpolated.

In a process of bilinear interpolation, a linear interpolation may be performed in one direction first. For example, a linear interpolation may be performed in X direction first, an interpolation point R2 is inserted between Q12 and Q22, and an interpolation point R1 is inserted between Q11 and Q21.

Then, another linear interpolation is performed in Y direction, and the point P is calculated by interpolation in the Y direction and R1 and R2 calculated in a first step.

Bicubic interpolation is a more complex interpolation method, through which a smoother image edge may be created than bilinear interpolation. In the bicubic interpolation, a value of a function f at a point (x, y) may be obtained by weighted averaging of the nearest sixteen sampling points in a rectangular grid, where two polynomials need to be used to interpolate a cubic function, and one is used in each direction.

Bicubic interpolation is also referred to as double cubic interpolation and is a method of "interpolating" or increasing a quantity or density of "pixels" in an image. Generally, interpolation technology is used to increase graphics data, so that a print area and (or) resolution may be increased when an image is printed or output in other ways.

No matter which interpolation method is adopted, mapping coordinates of each pixel point in a reference image to an image to be corrected need to be obtained at first. However, a large quantity of computation is required to use a relatively complex homography matrix to perform homography transformation on each pixel point, leading to long-time running during image processing process, thereby resulting in a poor applicability of a related product in an application scenario with a high timeliness requirement or a relatively low calculation capability.

In order to solve this problem, embodiments of the present specification provide an image processing method, as described above, simplifying a calculation process of mapping coordinates based on an idea of dividing an image into blocks to calculate the mapping coordinates, so that a quantity of computation required by the image processing method is reduced, and a processing efficiency is improved.

Exemplary Method

Figure 3:
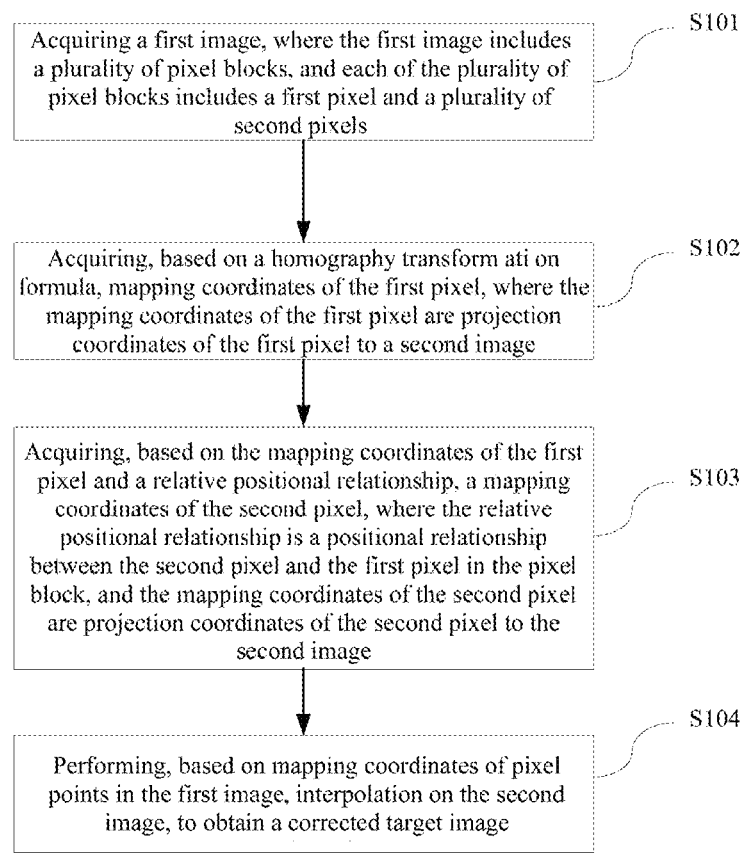
FIG. 3 is a flowchart of an image processing method according to an embodiment of the present specification.

An embodiment of the present specification provides an image processing method. As shown in FIG. 3, the image processing method includes the following steps.

S101: acquiring a first image, where the first image includes a plurality of pixel blocks, and each of the plurality of pixel blocks includes a first pixel and a plurality of second pixels.

The first image is to be converted to a second image or may also be referred to as a reference image. Before mapping coordinates of the first image is obtained, the first image may be divided into a plurality of pixel blocks first, and each of the plurality of pixel blocks may include a first pixel and a plurality of second pixels. The first pixel may be referred to as a base point of the pixel block. In the pixel block, positional relationships between the second pixels and the first pixel may be used as a basis for subsequently determination of mapping coordinates of the second pixels.

Optionally, pixel points (the first pixel and the second pixel) in the pixel block may be arranged in a matrix, and more specifically, the pixel points in the pixel block may be arranged in a rectangular matrix of m rows×n columns. The pixel points arranged in a matrix make a shape of the pixel block more regular, making the first image be divided in its entirety, which is conductive to determining the positional relationship between the second pixel and the first pixel more conveniently.

Figure 4:
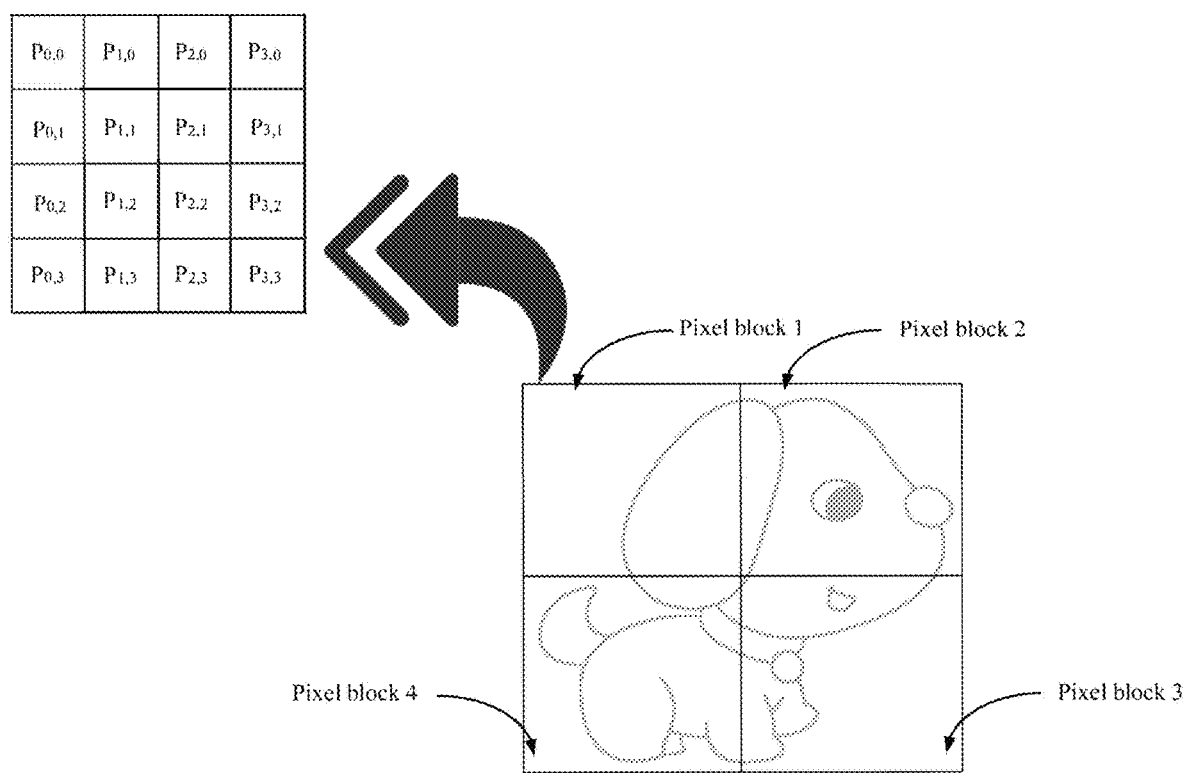
FIG. 4 is a schematic diagram of a manner of dividing a first image according to an embodiment of the present specification.

For example, FIG. 4 shows a manner of dividing a first image, and a manner of arranging pixel points in a pixel block. In FIG. 4, the first image is divided into four pixel blocks (a pixel block 1, a pixel block 2, a pixel block 3 and a pixel block 4). Each pixel block is the same in size, and pixel points in the pixel block are arranged in a rectangular matrix of 4 rows×4 columns, and the pixel points are respectively represented by Pi, j, where i=0, 1, 2, 3; j=0, 1, 2, 3. It should be understood that sizes of the pixel blocks included in the first image may also be different, and an arrangement of the pixel points in the pixel blocks may also be other manners (such as a circular matrix and the like) to meet requirements of different application scenarios. For example, when the first image is an image of an irregular shape, pixel blocks of different sizes and shapes in the first image may be more beneficial to dividing the pixel points in the first image. Therefore, the size of the pixel block in the first image and the arrangement manner of the pixel points in the pixel block are not limited in the present specification, and are specifically determined based on an actual situation.

In order to simplify complexity of subsequent process including determination of the relative positional relationship and computation of coordinates, in an embodiment of the present specification, step S101 includes:

acquiring the first image including a plurality of pixel blocks of a same size, where the first pixel in each pixel block is located at a same position in the pixel block.

When the sizes of the pixel blocks in the first image are the same (that is, widths and heights of the pixel blocks are the same), transformation precision of the mapping coordinates may be kept consistent and block division logic of the first image is simplified, which is beneficial to improving a computation speed. In addition, the first pixel in each pixel block is located at the same position in the pixel block (for example, the first pixels in the pixel blocks are all located at upper left corners of the pixel blocks), so that the positional relationship between the second pixel and the first pixel in each pixel block may be fixed, simplifying a subsequent calculation of the mapping coordinates of the second pixel according to the mapping coordinates of the first pixel and the relative positional relationship, and improving computation efficiency.

S102: acquiring, based on a homography transformation formula, mapping coordinates of the first pixel, where the mapping coordinates of the first pixel are projection coordinates of the first pixel to a second image.

As described above, the homography matrix may be used to perform, based on the homography transformation formula in a form of formula (1), the homography transformation on the first pixel, to obtain the mapping coordinates of the first pixel.

S103: acquiring, based on the mapping coordinates of the first pixel and a relative positional relationship, a mapping coordinates of the second pixel, where the relative positional relationship is a positional relationship between the second pixel and the first pixel in the pixel block, and the mapping coordinates of the second pixel are projection coordinates of the second pixel to the second image.

Figure 5:
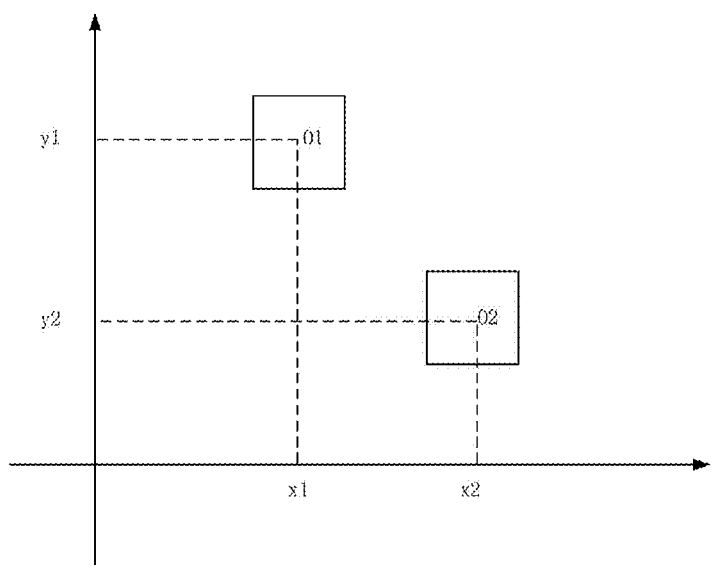
FIG. 5 is a schematic diagram of a positional relationship between two pixel points according to an embodiment of the present specification.

It is not difficult to understand that after the pixel block of the first pixel is determined, the positional relationship of each pixel point in the pixel block is determined. A position of each pixel point may be represented by a coordinate point in an XY coordinate system or may be represented by a coordinate point in a polar coordinate system. The positional relationship between two pixel points may be determined based on coordinate points of the two pixel points in a same coordinate system. Referring to FIG. 5, FIG. 5 shows coordinate points of two pixel points in the XY coordinate system, and the coordinate points of the pixel points may be represented by coordinate points of centers (O1 and O2) of the pixel points. Therefore, the coordinate points of the two pixel points in FIG. 5 are (x1, y1) and (x2, y2), respectively. The positional relationship between the two pixel points may be represented as follows. A horizontal coordinate distance between the pixel point O1 and the pixel point O2 is: X2−X1, and a vertical coordinate distance between the pixel point O1 and the pixel point O2 is: Y2−Y1. In addition, the positional relationship between the two pixels may also be represented as follows. A linear distance between the pixel point O1 and the pixel point O2 is: $\sqrt{(x_1-x_2)^2+(y_1-y_2)^2}$. Specific representation of the positional relationship between the pixel points in the present specification is not limited and is specifically determined based on an actual situation.

After the mapping coordinates of the first pixel are determined, the mapping coordinate of the second pixel may be determined based on the relative position relationship and the mapping coordinates of the first pixel. In this process, a relatively complex homography transformation process need not to be repeatedly performed, reducing a required quantity of computation and a computation requirement, and improving computation efficiency. It is not difficult to understand that, if a quantity of pixel points included in each pixel block is m×n, times of homography computation required for the first image may be reduced to 1/(m×n).

Optionally, an embodiment of the present specification provides a feasible method for acquiring, based on the mapping coordinates of the first pixel and a relative positional relationship, mapping coordinates of the second pixel, and specifically includes following steps.

S1031: superimposing the mapping coordinates of the first pixel with a relative distance to obtain the mapping coordinates of the second pixel, where the relative distance is a distance between the second pixel and the first pixel in the pixel block.

The relative distance may include a relative distance in each coordinate axis direction in a coordinate system where the first pixel and the second pixel are located. Still taking FIG. 5 as an example, assuming that the pixel point O1 is a first pixel and the pixel point O2 is a second pixel, a relative distance between the first pixel and the second pixel includes an X-axis distance and a Y-axis distance. Assuming that a coordinate point of the first pixel is (x1, y1) and a coordinate point of the second pixel is (x2, y2), then the X-axis distance is x2−x1 and the Y-axis distance is y2−y1. If the mapping coordinates of the first pixel are (xi, yi), the mapping coordinates of the second pixel may be calculated based on the X-axis distance and the Y-axis distance, that is, the mapping coordinates of the second pixel may be expressed as: (xi+x2−x1, yi+y2−y1). By means of the method, the mapping coordinates of the second pixel may be conveniently calculated and obtained, simplifying algorithm complexity.

S104: performing, based on mapping coordinates of pixel points in the first image, interpolation on the second image, to obtain a corrected target image.

After the mapping coordinates of the pixel points in the first image are obtained, in order to solve a problem that the first image and the second image are not aligned, interpolation needs to be performed, based on the mapping coordinates of the pixel points, on the second image, to correct a pixel position, so that the problem that the first image and the second image are not aligned may be solved.

As described above, a manner of interpolation may be linear interpolation, bilinear interpolation, bicubic interpolation and the like, which is not limited in the present specification.

Figure 6:
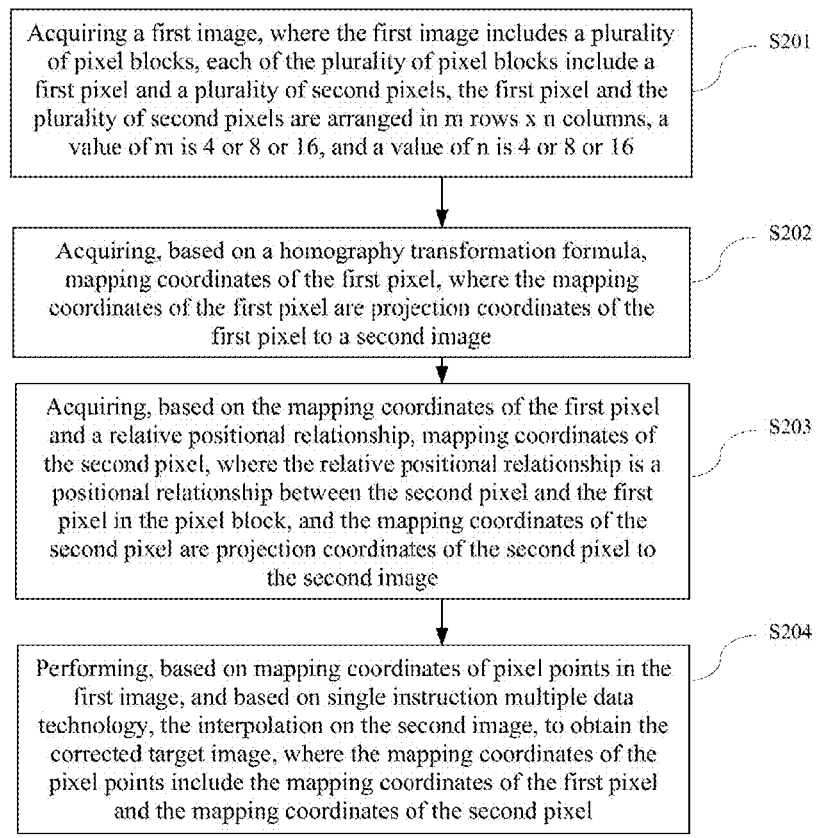
FIG. 6 is a flowchart of another image processing method according to an embodiment of the present specification.

In order to optimize a process of interpolation, an embodiment of the present specification further provides an image processing method, as shown in FIG. 6, including the following steps.

S201: acquiring a first image, where the first image includes a plurality of pixel blocks, each of the plurality of pixel blocks include a first pixel and a plurality of second pixels, the first pixel and the plurality of second pixels are arranged in m rows×n columns, a value of m is 4 or 8 or 16, and a value of n is 4 or 8 or 16.

In order to meet a bit width requirement of single instruction multiple data technology, a size of the pixel block in the first image is limited in step S201.

S202: acquiring, based on a homography transformation formula, mapping coordinates of the first pixel, where the mapping coordinates of the first pixel are projection coordinates of the first pixel to a second image.

S203: acquiring, based on the mapping coordinates of the first pixel and a relative positional relationship, mapping coordinates of the second pixel, where the relative positional relationship is a positional relationship between the second pixel and the first pixel in the pixel block, and the mapping coordinates of the second pixel are projection coordinates of the second pixel to the second image.

S204: performing, based on mapping coordinates of pixel points in the first image, and based on single instruction multiple data technology, the interpolation on the second image, to obtain the corrected target image, where the mapping coordinates of the pixel points include the mapping coordinates of the first pixel and the mapping coordinates of the second pixel.

The Single Instruction Multiple Data (SIMD) technology is a technology that uses a controller to control multiple processors and performs the same operation on each of a set of data (also referred to as "data vectors") to achieve spatial parallelism.

In this embodiment, in the process of interpolation, multiple mapping coordinates of the pixel point in the first pixel may be processed in parallel based on the single instruction multiple data technology, which is beneficial to improving operating efficiency of an algorithm.

Specifically, step S204 may include the following steps.

S2041: performing, based on the single instruction multiple data technology, taking a row of pixel points in the pixel block as a unit, linear interpolation on the second image in a first direction, to obtain an interpolation point of the row of pixel points in the pixel block in the first direction.

S2042: performing, based on the single instruction multiple data technology, taking the interpolation point of the row of pixel points in the pixel block in the first direction as a unit, linear interpolation on the second image in a second direction, to obtain the corrected target image, where the first direction intersects with the second direction.

In this embodiment, the linear interpolation may be performed on the row of pixels in the pixel block in the first direction and in the second direction simultaneously, based on the single instruction multiple data technology. Taking a pixel block of 8 rows×8 columns as an example, bilinear interpolation of 8 pixels in one row may be completed at a time, which is beneficial to improving operating efficiency of an algorithm.

Taking an ARM NEON instruction set as an example, a specific feasible execution method for step S2041 and step S2042 are explained below.

Optionally, step S2041 includes the following steps.

S20411: acquiring first adjacent coordinates, where the first adjacent coordinates include coordinates of an upper left pixel point, an upper right pixel point, a lower left pixel point and a lower right pixel point of preset mapping coordinates, and the preset mapping coordinates are mapping coordinates of a first pixel point of the row of pixel points in the pixel block.

In step S20411, at first, a first pixel point from the left of the row of pixel points in the pixel block is found, and then mapping coordinates of the first pixel point is rounded to obtain coordinate of a pixel point which is located at upper left corner adjacent to (or immediately adjacent to) an interpolation position of the first pixel point, which may be, for example, denoted as Pm, n. Then a simple calculation may be performed on horizontal and vertical coordinates based on the pixel point coordinates located at the upper left corner, so that the upper right pixel point, the lower left pixel point and the lower right pixel point of the preset mapping coordinates may be obtained respectively, which may be denoted as Pm+1, n, Pm, n+1, Pm+1, n+1 respectively. For example, assuming that mapping coordinates of a first pixel from the left of a certain row of pixel points in a certain pixel block is (7.05, 8.73), coordinates of a pixel point located at upper left corner adjacent to the mapping coordinates may be obtained as (7, 8) by rounding down the mapping coordinates, coordinates of a left lower pixel point adjacent to the mapping coordinates are obtained as (7, 9) by adding 1 to the vertical coordinate of (7, 8), coordinates of a right upper pixel point adjacent to the mapping coordinates are obtained as (8, 8) by adding 1 to the horizontal coordinate of (7, 8), and coordinates of a right lower pixel point adjacent to the mapping coordinates are obtained as (8, 9) by adding 1 to the horizontal and vertical coordinate of (7, 8).

S20412: loading N consecutive pixel values taking the first adjacent coordinates as a starting point into a first vector register corresponding to the first adjacent coordinates, where N is equal to a quantity of pixel points in the row of pixel points in the pixel block.

Figure 7:
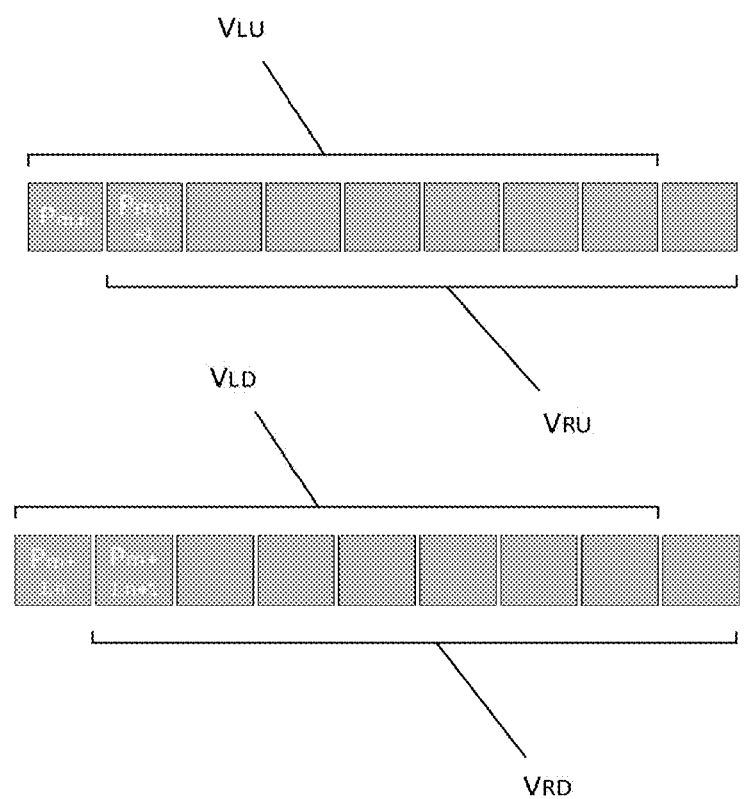
FIG. 7 is a schematic diagram of a step of loading N consecutive pixel values taking first adjacent coordinates as a starting point into a first vector register according to an embodiment of the present specification.

Still taking that the pixel block includes 8 rows×8 columns of pixel points, and the first adjacent coordinates of the first pixel point in a certain row is Pm, n, Pm+1, n, Pm, n+1, Pm+1, n+1 as an example, referring to FIG. 7, 8 consecutive pixel values taking the four pixel points of Pm, n, Pm+1, n, Pm, n+1, Pm+1, n+1 as starting points are respectively loaded into four first vector register of VLU, VRU, VLD, and VRD of four NEON modules. That is, 8 consecutive pixel values taking Pm, n as a starting point are loaded into the first vector register VLU, 8 consecutive pixel values taking Pm+1, n as a starting point are loaded into the first vector register VRU, 8 consecutive pixel values taking Pm, n+1 as a starting point are loaded into the first vector register VLD, and 8 consecutive pixel values taking Pm+1, n+1 as a starting point are loaded into the first vector register VRD. Since a type of image pixel values is typically 8bit, the first vector register may be an int8 vector register.

S20413: loading a first offset value and a second offset value into a second vector register and a third vector register respectively, where the first offset value is an offset, in the first direction, of a point to be interpolated relative to an upper left pixel point adjacent to the point to be interpolated, and the second offset value is an offset, in the second direction, of the point to be interpolated relative to the upper left pixel point adjacent to the point to be interpolated, and points to be interpolated are in one-to-one correspondence with pixel points in the first image.

According to the linear interpolation principle described above, offsets dx and dy of the interpolation point of the row of pixel points in the X and Y directions relative to the adjacent upper left pixel point are equal. Therefore, still taking that the first adjacent coordinates are four pixel points of Pm, n, Pm+1, n, Pm, n+1, Pm+1, n+1 as an example, if mapping coordinates of Pm, n are (Xm,n, Ym,n), then $$dx = Xm,n - m;$$

$$dy = Ym,n - n.$$

As the offsets dx and dy are both floating-point types, the second vector register and the third vector register may both be float32 vector registers of the Neon modules.

S20414: calculating, by using values loaded in the first vector register and the second vector register, based on a linear interpolation principle, interpolation points of the row of pixel points in the pixel block in the first direction.

According to the linear interpolation principle described above, specifically, step S20414 may include:

$$V_{x1} = (1 - V_{dx})V_{LU} + V_{dx}V_{RU};$$

$$V_{x2} = (1 - V_{dx})V_{LD} + V_{dx}V_{RD}.$$

$V_{x1}$ and $V_{x2}$ represent two interpolation points of the row of pixel points in the pixel block in the first direction. After the interpolation points of the row of pixel points in the first direction are obtained, step S20421 is implemented to perform linear interpolation in the second direction and complete a secondary linear interpolation process of the row of pixel points.

S20421: calculating, by using values loaded in the third vector register and the interpolation point of the row of pixel points in the first image in the first direction, according to the linear interpolation principle, interpolation points of the row of pixel points in the pixel block in the second direction.

Also, according to the linear interpolation principle described above, specifically, step S20421 may include:

$$V_R = (1 - V_{dy})V_{x1} + V_{dy}V_{x2}$$

In this way, the bilinear interpolation of the row of pixel points in the pixel block is completed, and other rows of pixel points in the pixel block are calculated according to above process. According to this method, the interpolation process of the pixel point may be performed in parallel, which is beneficial to improving execution efficiency of an algorithm.

In order to verify the image processing method provided in the embodiments of the present specification, in a specific embodiment of the present specification, on a Qualcomm 765G platform and based on an Android system environment, an image of a YUV420 format with a resolution of 4000×3000 is processed (corrected) with continuous 8 times of corrections, by using an existing method and the image processing method provided in the embodiments of the present specification respectively. Experimental data is shown in Table 1:

TABLE 1

| | Comparative Experimental Data | | | | | | | |
|---|---|---|---|---|---|---|---|---|
| | 1 | 2 | 3 | 4 | 5 | 6 | 7 | 8 |
| Existing method | 382 ms | 202 ms | 213 ms | 199 ms | 207 ms | 209 ms | 205 ms | 204 ms |
| Image processing method provided in the embodiments of the present specification | 98 ms | 47 ms | 42 ms | 39 ms | 43 ms | 43 ms | 45 ms | 42 ms |

It may be found from Table 1 that compared with the existing method for image correction (the existing method), the image processing method provided in the embodiments of the present specification may greatly shorten operation time of an algorithm and improve operating efficiency of the algorithm, so that the image processing method provided in the embodiments of the present specification may be applied to a device with relatively weak operation capability or an application scenario with a relatively high requirement for algorithm real-time performance, and a applicability of the image processing method is improved.

Exemplary Apparatus

Figure 8:
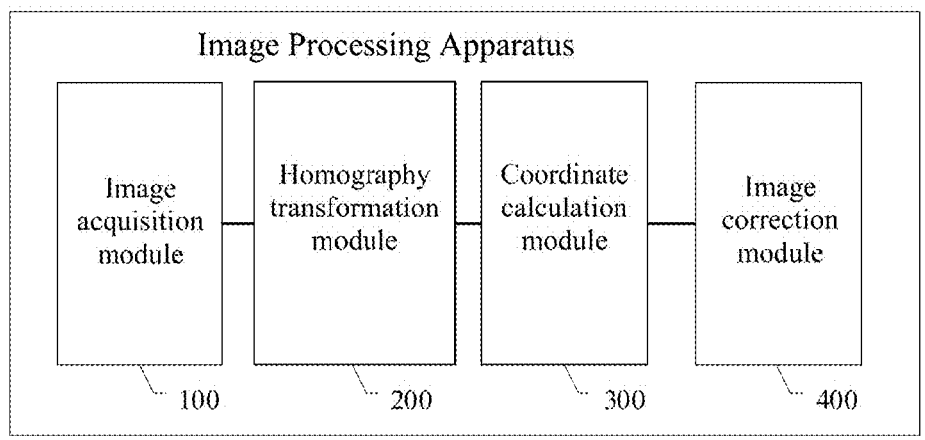
FIG. 8 is a schematic structural diagram of an image processing apparatus according to an embodiment of the present specification.

Corresponding to the image processing method described above, an embodiment of the present disclosure further provides an image processing apparatus, referring to FIG. 8, the apparatus includes:

an image acquisition module 100, configured to to acquire a first image, where the first image comprises a plurality of pixel blocks, and each of the plurality of pixel blocks includes a first pixel and a plurality of second pixels;

a homography transformation module 200, configured to acquire, based on a homography transformation formula, mapping coordinates of the first pixel, where the mapping coordinates of the first pixel is projection coordinates of the first pixel to a second image;

a coordinate calculation module 300, configured to acquire, based on the mapping coordinates of the first pixel and a relative positional relationship, mapping coordinates of the second pixel, where the relative positional relationship is a positional relationship between the second pixel and the first pixel in the pixel block, and the mapping coordinates of the second pixel are projection coordinates of the second pixel to the second image; and an image correction module 400, configured to perform, based on mapping coordinates of pixel points in the first image, interpolation on the second image, to obtain a corrected target image.

The image processing apparatus provided in the embodiment share the same application concept as the image processing method provided in the embodiments of the present disclosure, which may perform the image processing method provided in any embodiment of the present disclosure and has functional modules and beneficial effects corresponding to the image processing method. Technical details not described in detail in the embodiment may refer to specific processing content of the image processing method provided in embodiments of the present disclosure described above, and details will not be described herein again.

Exemplary Electronic Device

Figure 9:
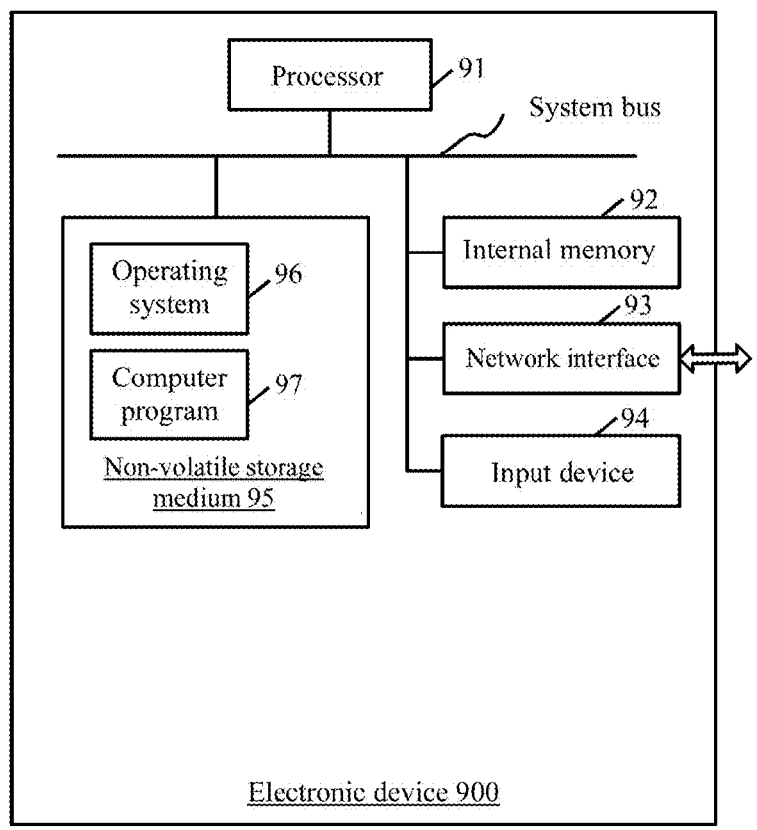
FIG. 9 is a schematic structural diagram of an electronic device according to an embodiment of the present specification.

Another embodiment of the present disclosure further provides an electronic device. Referring to FIG. 9, an exemplary embodiment of the present specification further provides an electronic device, including: a memory and a processor, where a computer program is stored in the memory, and when the computer program is run by the processor, steps of the image processing methods according to various embodiments of the present specification in the embodiments of the present specification described above are implemented.

An internal structure of the electronic device may be shown in FIG. 9, and the electronic device 900 includes a processor 91, a memory, a network interface 93, and an input device 94 connected by a system bus. The processor 91 of the electronic device 900 is configured to provide computing and control capabilities. The memory of the electronic device 900 includes a non-volatile storage medium 95 and an internal memory 92. An operating system 96 and a computer program 97 are stored in the non-volatile storage medium 95. The internal memory 92 provides an environment for operation of the operating system 96 and the computer program 97 in the non-volatile storage medium. The network interface 93 of the electronic device 900 is configured to communicate with an external terminal through network connection. When the computer program 97 is executed by processor 91, steps of the image processing methods according to various embodiments of the present specification in the embodiments of the present specification described above are implemented.

The processor may include a main processor, and may further include a baseband chip, a modem, and the like.

The memory stores a program for executing technical solutions of the present disclosure and may also store an operating system and other key services. Specifically, the program may include program codes, and the program codes include computer operation instructions. More specifically, the memory may include a Read-Only Memory (ROM), other types of static storage devices capable of storing static information and instructions, a Random Access Memory (RAM), other types of dynamic storage devices capable of storing information and instructions, a disk memory, a flash, and the like.

The processor may be an universal processor, such as an universal Central Processing Unit (CPU), a microprocessor, and the like, or may be an Application-Specific Integrated Circuit (ASIC), or one or more integrated circuits for controlling the execution of the program of the present disclosure. The processor may also be a Digital Signal Processor (DSP), an Application-Specific Integrated Circuit (ASIC), a field programmable gate array (FPGA), or other programmable logic device, a discrete gate or transistor logic device, or a discrete hardware component.

The input device may include a device for receiving data and information input by a user, such as a keyboard, a mouse, a camera, a scanner, a light pen, a voice input device, a touch screen, a pedometer or a gravity sensor and the like.

The output device may include a device that allows information to be output to a user, such as a display screen, a printer, a speaker, and the like.

The communication interface may include a device using any transceiver to communicate with other devices or communication networks, such as Ethernet, Radio Access Network (RAN), Wireless Local Area Network (WLAN) and the like.

The processor executes the program stored in the memory, and invokes other devices, and may be used to implement the steps of any one of the image processing methods provided in the embodiments of the present disclosure described above.

The electronic device may further include a display module and a voice module, the display module may be a liquid crystal display screen or an electronic ink display screen, and the input device of the electronic device may be a touch layer covered on the display assembly, or may be a key, a trackball, or a touchpad disposed on a housing of the electronic device, or may be an external keyboard, a touchpad, or a mouse, and the like.

A person skilled in the art may understand that the structure shown in FIG. 9 is merely a block diagram of a partial structure related to the solution of the present specification, and does not constitute a limitation on an electronic device applied to the solution of the present specification, and a specific electronic device may include more or fewer components than those shown in the figure, or a combination of some components, or have different component arrangements.

Exemplary Computer Program Product and Storage Medium

In addition to the method and device described above, the image processing method provided in the embodiments of the present specification may also be a computer program product, which includes computer program instructions, and when the computer program instructions are run by the processor, the processor executes the steps of the image processing method according to various embodiments of the present specification as described in the above-mentioned "Exemplary Method" part of the present specification.

The computer program product may use any combination of one or more programming languages to write program codes for executing the operation of the embodiments of the present specification. The programming language includes object-oriented programming languages, such as Java, C++ and the like, as well as conventional procedural programming languages, such as "C" languages or similar programming languages. The program codes may be executed entirely on a user computing device, partly on a user device, as a stand-alone software package, partly on the user computing device, partly on a remote computing device, or entirely on the remote computing device or server.

In addition, embodiments of the present specification further provide a computer-readable storage medium, on which a computer program is stored, and the computer program is executed by a processor to execute the steps of the image processing method according to various embodiments of the present specification as described in the above-mentioned "Exemplary Method" section of the present specification.

A person of ordinary skill in the art may understand that all or some of the processes in the method in the foregoing embodiments may be implemented by a computer program instructing related hardware, and the computer program may be stored in a non-volatile computer-readable storage medium. When the computer program is executed, the computer program may include procedures of embodiments of the foregoing methods. Any reference to memory, storage, database, or other medium used in the embodiments provided in the present specification may include non-volatile and/or volatile memory. The non-volatile memory may include a Read-Only Memory (ROM), a Programmable Read-Only Memory (PROM), an Electrically Programmable Read-Only Memory (EPROM), an Electrically Erasable Programmable Read-Only Memory (EEPROM), or a flash memory. Volatile memory may include Random Access Memory (RAM) or external cache. For illustration, and not limitation, RAM may be available in various forms, such as Static Random Access Memory (SRAM), Dynamic Random Access Memory (DRAM), Synchronous Dynamic Random Access Memory (SDRAM), Dual Data Rate Synchronous Dynamic Random Access Memory (DDRSDRAM), Enhanced Synchronous Dynamic Random Access Memory (ESDRAM), Dynchlink Dynamic Random Access Memory (SLDRAM), Random Access Memory Bus (RAMBUS), Direct Random Access Memory (RDRAM), Direct Memory Bus Dynamic Random Access Memory (DRDRAM), and Memory Bus Dynamic Random Access Memory (RDRAM).

Technical features of the above embodiments may be combined arbitrarily. To make the description concise, all possible combinations of the technical features in the foregoing embodiments are not described. However, as long as there is no contradiction in the combination of these technical features, it should be considered to be within the scope of the present specification.

The above embodiments merely illustrate several embodiments of the present specification, and the description thereof is more specific and detailed, but may not be understood as a limitation to the scope of the solutions provided in the embodiments of the present specification. It should be noted that, for a person of ordinary skill in the art, several variations and improvements may be made without departing from the concept of the present specification, which are all within the scope of protection of the present specification. Therefore, the scope of protection of this specification shall be subject to the appended claims.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present invention. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

Systems and methods describing the present invention have been described. It will be understood that the descriptions of some embodiments of the present invention do not limit the various alternative, modified, and equivalent embodiments which may be include within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

The invention claimed is:

1. An image processing method, comprising:
   acquiring a first image, wherein the first image comprises a plurality of pixel blocks, and each of the plurality of pixel blocks comprises a first pixel and a plurality of second pixels, wherein each pixel block includes a pixel array of m rows×y n columns;
   acquiring, based on a homography transformation formula, mapping coordinates of the first pixel, wherein the mapping coordinates of the first pixel are projection coordinates of the first pixel to a second image;
   acquiring, based on the mapping coordinates of the first pixel and a relative positional relationship, mapping coordinates of one of the plurality of second pixels, wherein the relative positional relationship is a positional relationship between one of the plurality of second pixels and the first pixel in the pixel block, and the mapping coordinates of one of the plurality of second pixels are projection coordinates of one of the plurality of second pixels to the second image; and
   performing, based on mapping coordinates of pixel points in the first image by using a single instruction multiple data technology, interpolation on the second image, to obtain a corrected target image;
   wherein the interpolation operation comprises:
   performing linear interpolation on the second image in a first direction, with a single row of pixels in the pixel block as a processing unit, to obtain an intermediate interpolation point of the row of pixels in the first direction; and
   performing linear interpolation on the second image in a second direction, with the intermediate interpolation point obtained in the first direction as a processing unit, to obtain the corrected target image, wherein the first direction and the second direction intersect with each other.

2. The image processing method according to claim 1, wherein the acquiring, based on the mapping coordinates of the first pixel and a relative positional relationship, mapping coordinates of one of the plurality of second pixels comprises:
   superimposing the mapping coordinates of the first pixel with a relative distance to obtain the mapping coordinates of one of the plurality of second pixels, wherein the relative distance is a distance between one of the plurality of second pixels and the first pixel in the pixel block.

3. The image processing method according to claim 2, wherein the distance between one of the plurality of second pixels and the first pixel comprises a relative distance in each coordinate axis direction in a coordinate system where the first pixel and one of the plurality of second pixels are located.

4. The image processing method according to claim 1, wherein a value of m is 4 or 8 or 16, and a value of n is 4 or 8 or 16.

5. The image processing method according to claim 4, wherein the performing, based on the mapping coordinates of the pixel points in the first image, and based on a single instruction multiple data technology, the interpolation on the second image, to obtain the corrected target image comprises:
   performing, based on the single instruction multiple data technology, taking a row of pixel points in the pixel block as a unit, linear interpolation on the second image in the first direction, to obtain interpolation points of the row of pixel points in the pixel block in the first direction; and
   performing, based on the single instruction multiple data technology, taking the interpolation points of the row of pixel points in the pixel block in the first direction as a unit, linear interpolation on the second image in the second direction, to obtain the corrected target image, wherein the first direction intersects with the second direction.

6. The image processing method according to claim 5, wherein the performing, based on the single instruction multiple data technology, taking the row of pixel points in the pixel block as the unit, linear interpolation on the second image in the first direction comprises:
   acquiring first adjacent coordinates, wherein the first adjacent coordinates comprise coordinates of an upper left pixel point, an upper right pixel point, a lower left pixel point and a lower right pixel point of preset mapping coordinates, and the preset mapping coordinates are mapping coordinates of a first pixel point of the row of pixel points in the pixel block;
   loading N consecutive pixel values taking the first adjacent coordinates as a starting point into a first vector register corresponding to the first adjacent coordinates, wherein N is equal to a quantity of pixel points in the row of pixel points in the pixel block;
   loading a first offset value and a second offset value into a second vector register and a third vector register respectively, wherein the first offset value is an offset, in the first direction, of a point to be interpolated relative to an upper left pixel point adjacent to the point to be interpolated, and the second offset value is an offset, in the second direction, of the point to be interpolated relative to the upper left pixel point adjacent to the point to be interpolated, and points to be interpolated are in one-to-one correspondence with pixel points in the first image; and
   calculating, by using values loaded in the first vector register and the second vector register, based on a linear interpolation principle, the interpolation points of the row of pixel points in the pixel block in the first direction.

7. The image processing method according to claim 6, wherein the performing, based on the single instruction multiple data technology, taking the interpolation points of the row of pixel points in the pixel block in the first direction as a unit, linear interpolation on the second image in a second direction comprises:
   calculating, by using values loaded in the third vector register and the interpolation points of the row of pixel points in the first image in the first direction, according to the linear interpolation principle, interpolation points of the row of pixel points in the pixel block in the second direction.

8. The image processing method according to claim 1, wherein the acquiring the first image comprises:
   acquiring the first image comprising a plurality of pixel blocks of a same size, wherein a first pixel in each of the pixel blocks is located at a same position in the pixel block.

9. The image processing method according to claim 1, wherein a size of each of the plurality of pixel blocks is not the same with each other.

10. An electronic device, comprising: a memory and a processor, wherein
   the memory is connected to the processor, and configured to store a program; and
   the processor is configured to implement the image processing method according to claim 1 by running the program stored in the memory.

11. A non-transitory storage medium, wherein a computer program is stored on the non-transitory storage medium, and when the computer program is run by a processor, the image processing method according to claim 1 is implemented.

* * * * *